United States Patent [19]

Tanigaki

[11] 4,400,725

[45] Aug. 23, 1983

[54] PICTURE DISPLAY-IMAGE PICKUP APPARATUS

[76] Inventor: Suzuyo Tanigaki, 4-8-3, Nakashizu, Sakura-shi, Chiba-ken, Japan

[21] Appl. No.: 346,602

[22] Filed: Feb. 8, 1982

Related U.S. Application Data

[63] Continuation of Ser. No. 162,591, Jun. 24, 1980, abandoned.

[30] Foreign Application Priority Data

Jan. 25, 1980 [JP] Japan .................................. 55-22535
Jan. 25, 1980 [JP] Japan .................................. 55-22535

[51] Int. Cl.³ ............................................. H04N 7/18
[52] U.S. Cl. ................................. 358/85; 179/2 TV; 358/236
[58] Field of Search ............... 358/85, 236; 179/2 TV

[56] References Cited

U.S. PATENT DOCUMENTS 2,017,883 10/1935 Zworykin ............................ 358/85
2,420,198 5/1947 Rosenthal ............................ 358/85
3,755,623 8/1973 Cassagne ............................ 358/85

FOREIGN PATENT DOCUMENTS 56-119586 9/1981 Japan .................................. 358/85
56-152387 11/1981 Japan .................................. 358/85

Primary Examiner—Howard Britton
Attorney, Agent, or Firm—Woodcock, Washburn, Kurtz, Mackiewicz & Norris

[57] ABSTRACT

A picture display-image pickup apparatus for visual communication includes a picture display device and an image pickup device. The display device and pickup device are arranged on a substantially common optical axis directing to a talker.

15 Claims, 12 Drawing Figures

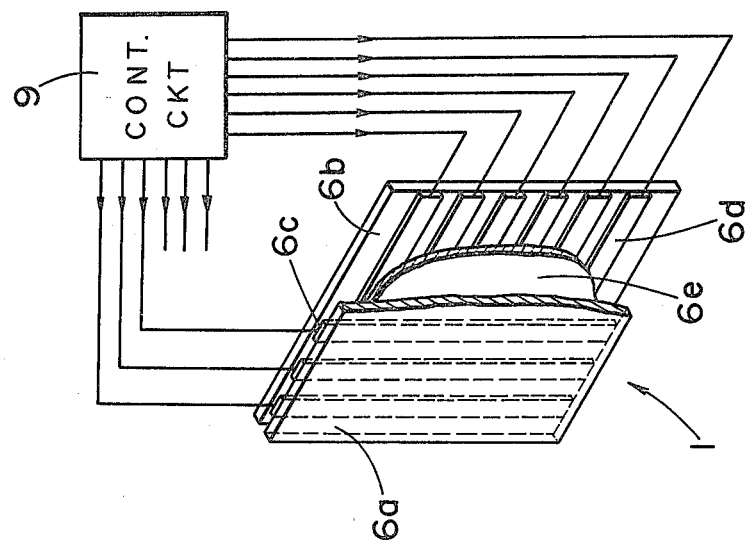
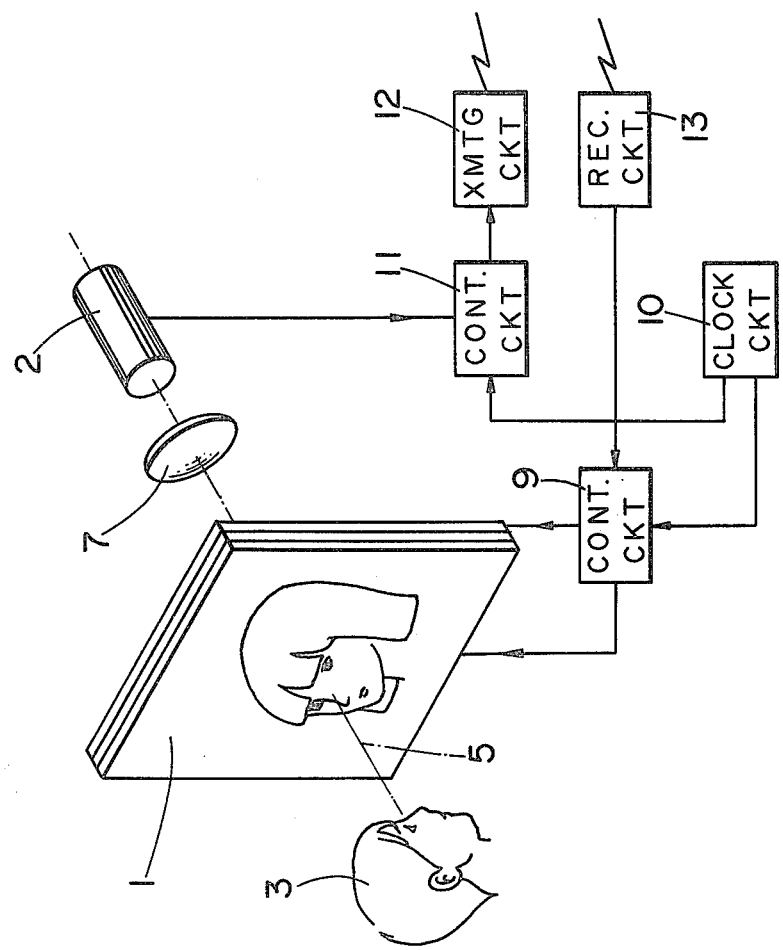

PICTURE DISPLAY-IMAGE PICKUP APPARATUS

This is a continuation of application Ser. No. 162,591, filed June 24, 1980.

BACKGROUND OF THE INVENTION

1. Field of the Invention

The present invention relates to a picture display-image pickup apparatus for two-way visual communication such as a video telephone, and more particularly to a picture display-image pickup device, by which talkers can look at each other.

2. Description of the Prior Art

In a conventional visual communication system, a picture display device and an image pickup device are independent of each other. This is apparent if a television broadcasting service is taken into consideration as a concrete example. The picture display device is exemplified by a television receiver using a Braun tube for processing a video information transmitted from a television station thereby to accomplish the display only. On the other hand, the image pickup device is exemplified by a television camera, by which an image is picked up and cut at the television station so that it is transmitted to the television receiver. Thus, the television camera is used only for picking up the image. In these ways, the information flows unidirectionally from the television station using the television camera to the individuals using the television receivers. This mode has been sufficient in the case of the television broadcasting service, in which the information is broadcast from a specified transmitter to may and unspecified persons. Recently, however, information technology has advanced, and the capacity of the network of transmission lines has been increased by the use of optical cables so that the establishment of information transmitting means of not one-way but two-way type has been desired. The two-way communication has been realized and widely spread by telephones in the audio field but has never been established in the video field yet. One of causes is based upon the fact that the conventional network of transmission lines has such a small capacity that it cannot transmit far more information than the audio system. Another cause comes from that there has never been proposed such a picture display and image pickup apparatus as can allow the real two-way communication. It is needless to say that an apparatus for allowing the two-way visual communication which is called the "video telephone" has been investigated. However, the picture display and image pickup device having been used in the video telephone cannot be free from the following drawbacks.

In the video telephone, generally speaking, the picture display device and the image pickup device are arranged at a more or less spacing in a plane directing to a talker. As a result, the two talkers look at their display devices but not their pickup devices so that they never look at each other. This failure in looking at each other is a decisive drawback in case the two-way communication is to be visually accomplished. Therefore, the conventional system thus far described has almost lost the justification for its existence.

SUMMARY OF THE INVENTION

It is therefore an object of the present invention to provide a picture display-image pickup apparatus which can ensure the two-way visual communication while allowing the talkers to look at each other.

In accordance with an aspect of the present invention, there is provided a picture display-image pickup apparatus for visual communication, including a picture display device and an image pickup device which are arranged on a substantially common optical axis directing to a talker.

BRIEF DESCRIPTION OF THE DRAWINGS

Other objects, features and advantages of the present invention will be apparent from the following description taken in conjunction with the accompanying drawings, in which:

FIG. 3 is a block diagram showing a picture display-image pickup apparatus according to one embodiment of the present invention;

FIG. 4 is a perspective view showing the picture display device of FIG. 3;

DESCRIPTION OF THE PREFERRED EMBODIMENTS

The embodiments of the present invention will be described in the following with reference to the accompanying drawings. Prior to entering into the description of the embodiments, the drawbacks concomitant with the picture display-image pickup apparatus such as the video telephone for visual communication will be described.

Figure 1A:
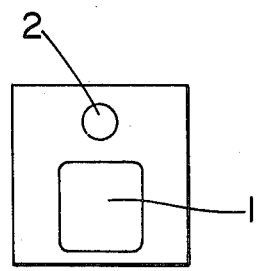
FIGS. 1A and 1B are a front elevation and a sectional view showing a video telephone according to the prior art.
Figure 1B:
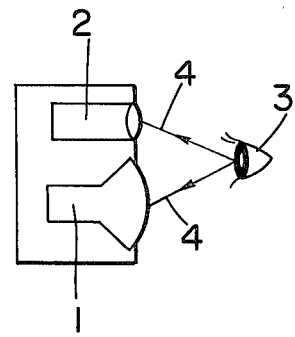

FIGS. 1A and 1B are a front elevation and a sectional view showing the conventional video telephone. This video telephone is constructed to include a picture display device 1 such as a Braun tube and an image pickup device 2 such as a television camera, which are arranged at a certain spacing in the front of the video telephone. Indicated at reference numerals 3 and 4 in FIG. 1B are the eye of a talker for communication and his lines of vision, respectively. The fundamental drawback concomitant with the conventional system resides in that the talkers will look at the display Braun tube 1 not at each other, due to the optical divergence between the picture display device 1 and the image pickup device 2, so that their lines of vision are directed not to the television camera 2 but to the display Braun tube 1. As a result, the talkers fail to look at each other. The apparatus, in which the talkers cannot look at each other, has a decisive drawback, in case it is used to accomplish the two-way visual communication, so that it almost loses the justification for its existence.

Figure 2A:
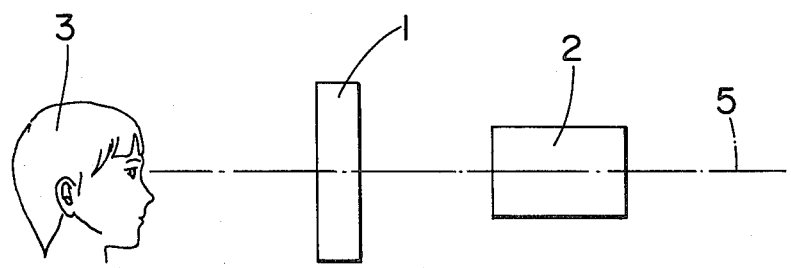
FIGS. 2A and 2B are diagrammatic views illustrating the fundamental concepts of the present invention.
Figure 2B:
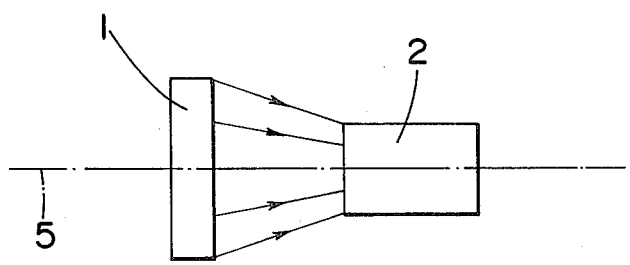

FIGS. 2A and 2B illustrate the fundamental concept of the present invention.

The fundamental concept of the present invention resides, as shown in FIG. 2A, in that the picture display device and the image pickup device are arranged on a common optical axis. The arrangement on the common optical axis according to the present invention means, as shown in FIG. 2B, that the display device 1 and the pickup device 2 are arranged on a common axis 5 such that substantially all the display region of the display device 1 is included in the sensing region of the pickup device 2.

If the talker 3 looks at his partner appearing in the display device 1, as shown in FIG. 2A, his image is picked up by the pickup device 2 which is arranged on the common optical axis 5 with the aforementioned display device 1. As a result, if the talker looks into the eyes of his partner in the display device 1, the lines of his vision are picked up by the pickup element, which is positioned to correspond to the pickup device 2 at the back of the eyes of his partner so that the image to be transmitted to the partner is that to which the lines of his vision are directed. Thus, the two talkers can talk while looking at each other.

Figure 5:
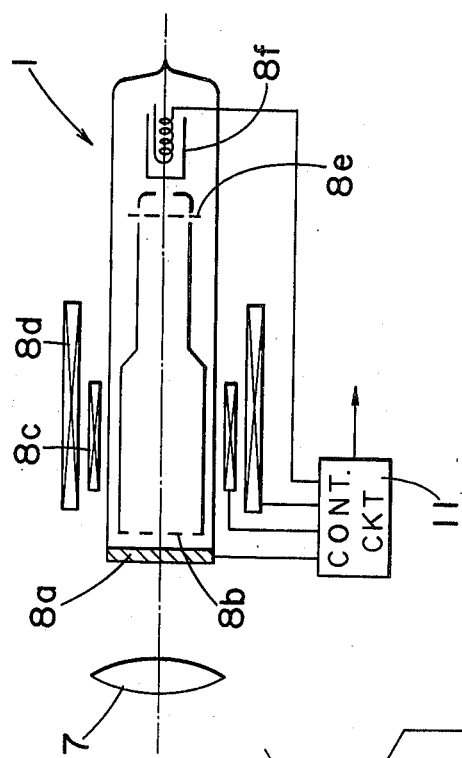
FIG. 5 is a sectional view showing the image pickup device of FIG. 3.

FIG. 3 is a block diagram showing one embodiment of the present invention, and FIGS. 4 and 5 are detailed views showing the display device and pickup device of the embodiment, respectively. As shown in FIG. 4, the display device 1 is prepared by interposing or sandwitching a display substance 6e such as liquid crystal, PLZT or EC, which can select its transparent and opaque conditions in accordance with the electric field, heat, pressure and the like applied, between two transparent plates 6a and 6b of glass. Here, PLZT is electrochromatic material which is a piezo-ceramic made of a solid solution of an oxide containing lead, lanthanum, zircon and titanium. On the sides of the transparent plates 6a and 6b facing the display substance 6e, there are vertically and horizontally arranged a plurality of transparent electrodes 6c and 6d which are made of $SnO_2$. By these transparent electrodes 6c and 6d, the voltage, heat or the like is applied to the display substance 6e so that the optical anisotropy may be effected in the display substance at a position corresponding to the grating points of the respective electrodes, thus accomplishing the picture display of dot matrix type.

As the image pickup device 2, there can be used an image pickup tube such as a vidicon, Plumbicon (Trade Name) or Saticon (Trade Name). FIG. 5 is a sectional view showing a general image pickup tube, in which a lens 7 for condensing the light having passed through the display device 1 is disposed in front of the image pickup tube 2 so that the image is focused on a photoconductive layer 8a of $Sb_2S_3$ or the like. In case the vidicon is used as the image pickup tube, the electron beam generated by a cathode 8f passes through an aperture 8e and sweeps the target face by the actions of a deflecting yoke 8c and a focusing coil 8d so that the change in the charges, which are generated on the photoconductive layer 8a in accordance with the image of the talker 3, is transduced into a video signal.

Reference numeral 11 in FIG. 3 indicates the control circuit of the image pickup tube 2, which is operated to establish the video information in accordance with the position of the target face and the level of the signal. Numeral 9 indicates the control circuit of the picture display device 1 for converting the display information fed into both the positional information in X and Y directions and the level so that the optical anisotropy of the display substance 6e at the corresponding position may be established. Numeral 12 indicates the transmitting circuit of the video information for effecting contacts with transmitting lines. Numeral 13 indicates a receiving circuit for temporarily storing the display information of the partner coming from the lines. Numeral 10 indicates a clock circuit for timing adjustment of the apparatus as a whole.

The display information transmitted from the partner is stored in the receiving circuit 13 until it is fed to the display control circuit 9. When the command of the display output comes from the clock circuit 10, the picture is displayed in the display device 1 such that the X-Y address and the level correspond. Since the display is performed at a predetermined scanning speed, after the time period necessary for the display effects in the human eyes, the place, which has been opaque until the subsequent scanning operation, becomes transparent so that the image of the talker passes through the display device 1 and the lens 7 until it reaches the image pickup device 2. Thus, the image of the talker 3 having reached the pickup device 2 is converted by the control circuit 11 into the image information corresponding to the address and the level, which is fed to the transmitting circuit 12 so that it is transmitted through the lines to the partner. In these ways, the display and pickup of the image are accomplished in parallel.

In case a liquid crystal is used as the display unit, there can be used as the display system such as a TN system using a nematic liquid crystal, a DSM (Dynamic Scattering Mode) system, a DAP (Distorsion of Align Phase) system, a two frequency system, a PT system using a mixture of a cholesteric liquid crystal and a nematic liquid crystal and so on. The electrodes can also be exemplified by a group of simplified X-Y transparent electrodes, or such electrodes with drive elements as are formed at each picture element with an SOS (Selicon on Sapphire) or a TFT (Thin Film Transistor) on glass. As the image pickup tube, moreover, there can be used the vidicon of storage, photoconuductive or image type, Calnicon, Plumvicon, Saticon, Newvicon or a silicon diode array vidicon.

In order to enhance the display effect, on the other hand, a reflecting plate can be interposed in a preset frequency between the display device 1 and the lens 7.

Figure 6:
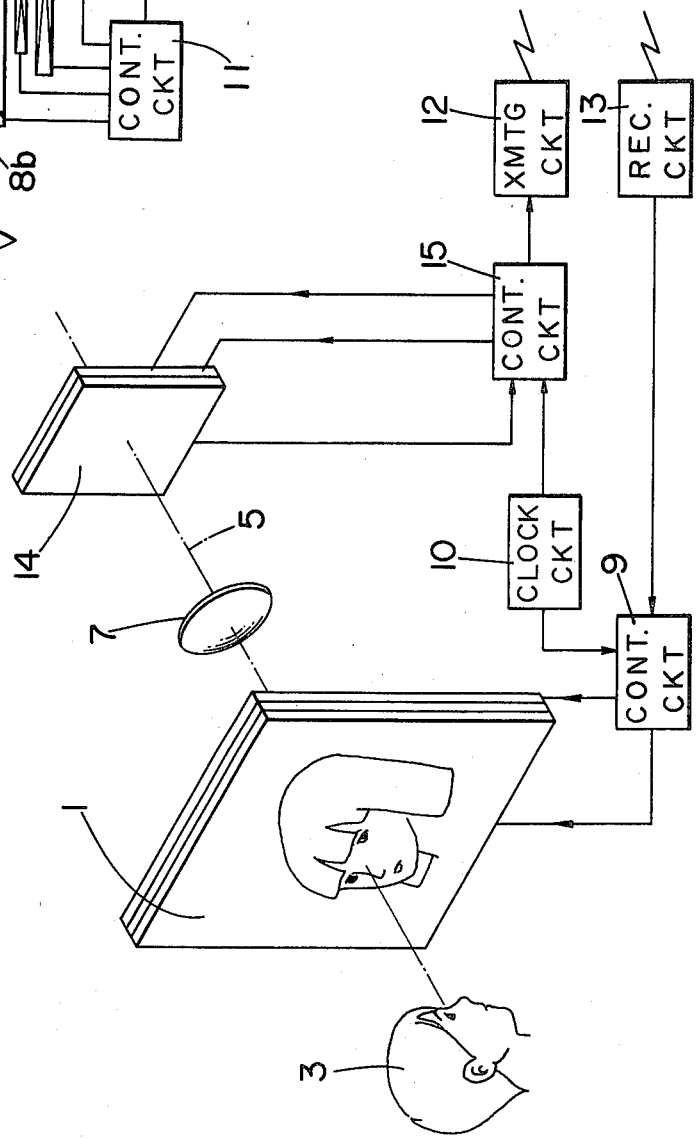
FIG. 6 is a block diagram showing a modification of the picture display-image pickup apparatus according to the embodiment of FIG. 3.
Figure 7:
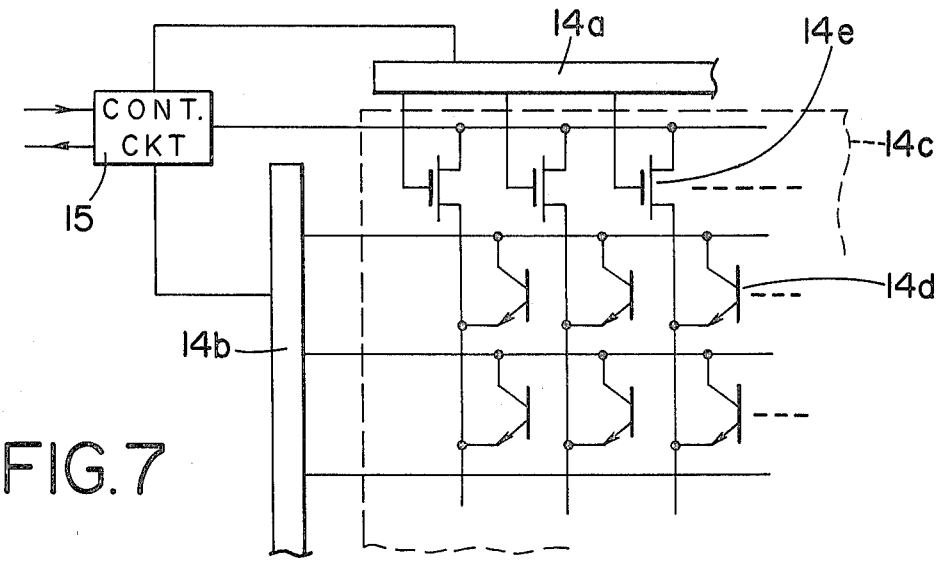
FIG. 7 is a circuit diagram of the image pickup device shown in FIG. 6.

Now, FIG. 6 is a block diagram showing one modification of the example of FIG. 3. FIG. 7 is a circuit diagram showing the construction of the image pickup device of FIG. 6 using a solid state image sensing element. The embodiment to be described is basically the same as the foregoing one excepting that an image pickup device 14 using a solid state image sensing element is used as the image pickup device. If this used is made, the overall capacity of the picture display-image pickup apparatus can be made far more compact that that in case the image pickup tube is used.

If the talker looks at the picture in the display device 1 using a transillumination controllable substance such as a liquid crystal or PLZTEC, the light passes, when the display unit turns transparent, through the display device 1 and the lens 7 until it reaches the image pickup device 14 using a solid state image sensing element. The light excites the an image pickup element 14d at a corresponding address and is fed out through the signal lines by the scanning operations of X and Y axis shaft registers 14a and 14b, when one of output gate 14e is opened, so that it is processed as the video information containing the address and intensity by a control circuit 15 until it is transmitted to the partner through the lines from the transmitting circuit 12.

As the solid state image sensing element 14d, on the other hand, there can be used an X-Y address type element, in which a phototransistor or a photodiode is prepared to correspond to the X-Y address, or a charge transfer type element such as CCD or BBD. Especially, the charge transfer type element has such a simple construction as can enhance its integration and compactness. Incidentally, the solid state image sensing element is formed on a substrate 14c which in turn can be formed with a semiconductor element such as silicon monocrystal.

Figure 8:
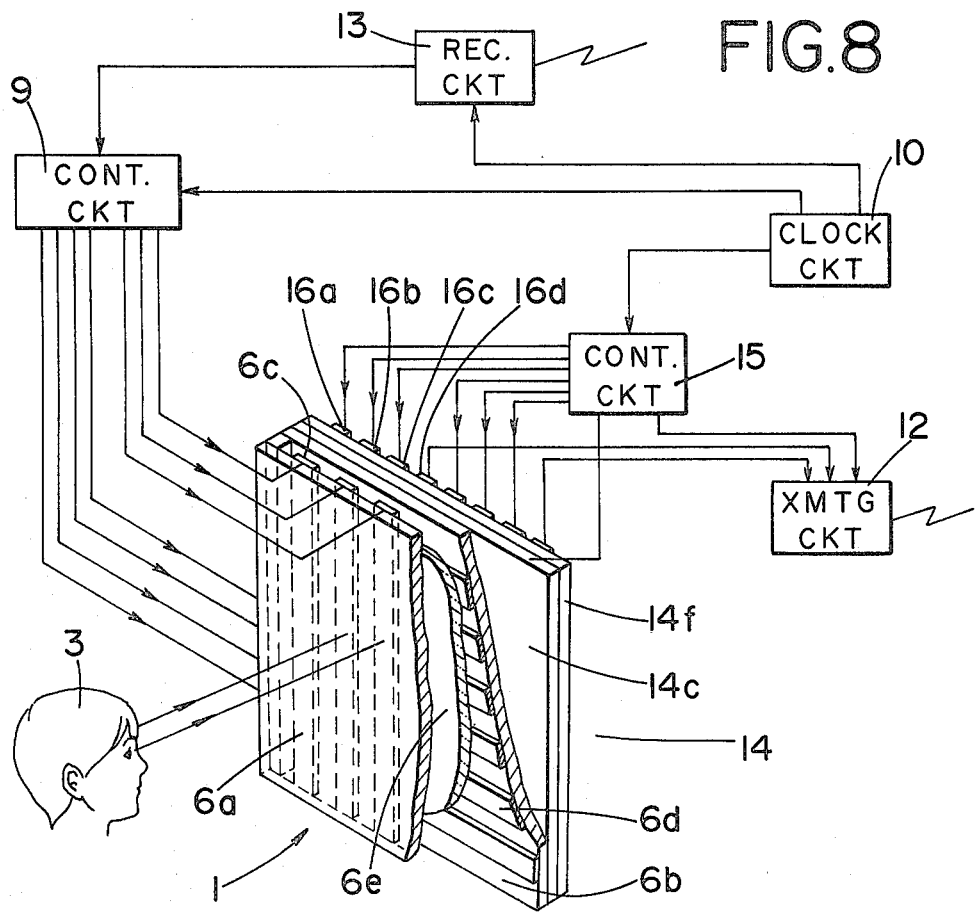
FIG. 8 is a block diagram showing a modification of the picture display-image pickup apparatus according to the embodiment of FIG. 6.

FIG. 8 shows a modification of FIG. 6, in which the display device 1 and the image pickup device 14 are integrated. The video information transmitted is temporarily stored in the receiving circuit 13 and then is fed to the display control circuit 11 in accordance with the timing pulses which are generated by the clock circuit 10. Here, the video information is converted into such a voltage signal as is necessary for forming a picture to be fed to the corresponding transparent electrodes 6c and 6d of the display device 1, whereby the image of the partner is formed in the display device 1.

In response to the subsequent pulse of the clock circuit 10, the voltage impressed upon the respective transparent electrodes is liberated to render the display device 1 of the elements 6a to 6e transparent. Incidentally, numerals 14c and 14f indicate a semiconductor layer and an oxide layer of a dielectric material such as $SiO_2$. Numerals 16a, 16b, 16c and 16d indicate a group of electrodes of Al, of which the CCD type image pickup device 14 is composed. When the display layer is turned transparent in response to the aforementioned pulses of the clock circuit 10, the light from the object 3 passes through the display layer and irradiates the image pickup device. This irradiating light has its level changed in accordance with the brightness of the respective portions of the object so that the level of the charge to be generated at the CCD portion in the corresponding position accords with that level. When the necessary pulse voltage is impressed upon the gate electrode group 16a in response to the pulse subsequent to the aforementioned pulses from the clock circuit 10, a depletion layer is formed in the interface between the semiconductive layer 14c and oxide layer 14f corresponding to said electrode group. The resultant depletion layer is illuminated with the light coming from the outside through the display layer being transparent so that the charge is generated to correspond to the corresponding position of the image pickup device and to the level of the coming light. By impressing a higher voltage than that impressed upon the electrode group 16a upon the electrode group 16b in response to the pulse subsequent to the aforementioned pulses from the clock circuit 10, the charges stored in the interface corresponding to the electrode group 16a move in the interface until they are transferred to the position corresponding to the electrode group 16b. At this time, the irradiation of the image pickup device with the light coming from the object 3 is required any more, and it is sufficient to effect the display function in synchronism with the aforementioned pulses of the clock circuit 10.

During the period while the video information having been transmitted and stored in the receiving circuit 12 is being displayed in the display device 1, the charges stored in the interface corresponding to the electrode group 16b, i.e., the object information having been obtained in advance from the object 3 are extracted from the output electrode 16d in synchronism with the video position information from the control circuit 15 for the video information processing by impressing the higher pulse voltage upon the electrode group 16c from the electrode group 16b so that they are combined with the video position information and stored in the transmitting circuit 12 until they are consecutively transmitted.

The procedures thus far described are repeated for the picture display and for the image pickup. If, in those procedures, the picture display and the image pickup are accomplished at a shorter time interval than a certain value, the image can be visualized as a sufficiently continuous picture to the human eyes. Thus, since the image pickup device is situated at the position of the partner's eyes, the talkers can communicate each other without any different feeling while looking at each other.

Incidentally, in case a transillumination controllable substance is used in the display device, the whole frame is simultaneously turned on and off, if the response time is sufficiently short, so that the picture can be formed by using the quantity of light of the whole addresses of the image pickup device as an input when the whole frame is transparent under either the ON or OFF condition. In case, however, such a substance, e.g., a liquid crystal as has not so short response time is used, a system is preferable, in which the transparent condition is established for each scanning line so that the signal may be processed for each corresponding scanning line of the image pickup device.

Figure 9:
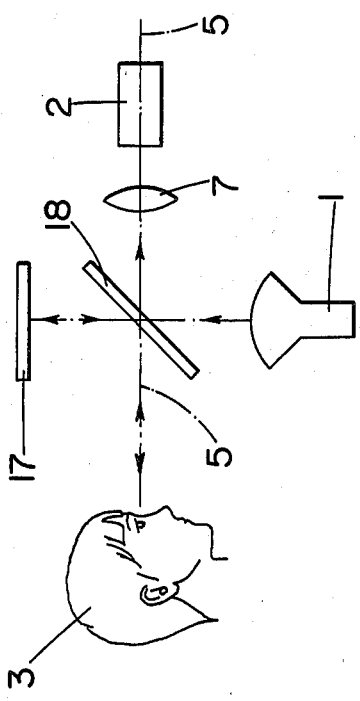
FIG. 9 is a diagrammatic view illustrating another embodiment of the present invention.

FIG. 9 shows another embodiment of the present invention, in which the positional relationship between the display device 1 and the image pickup device 2 is made by the construction of the figure such that they are arranged on the common optical axis. The light to be introduced into the image pickup device 2 such as the image pickup tube is reflected from the talker 3 to pass through a semitransparent mirror 18 until it reaches the pickup device 2. On the other hand, the picture of the display device 1 such as the CRT also passed through the semitransparent mirror 18 and is reflected by a reflecting mirror 17. When the picture is then returned to the semitransparent mirror 18, it is reflected to the talker 3. As a result, since the lines of vision of the talker are directed not only to his partner but also to the image pickup device, the partner himself can collimate his lines of vision with those of the talker. Since, according to this system, the image pickup is performed no matter which the display device 1 might be transparent or not, the overall driving system can be simplified, and the talkers can always look at each other in a real time manner.

Figure 10:
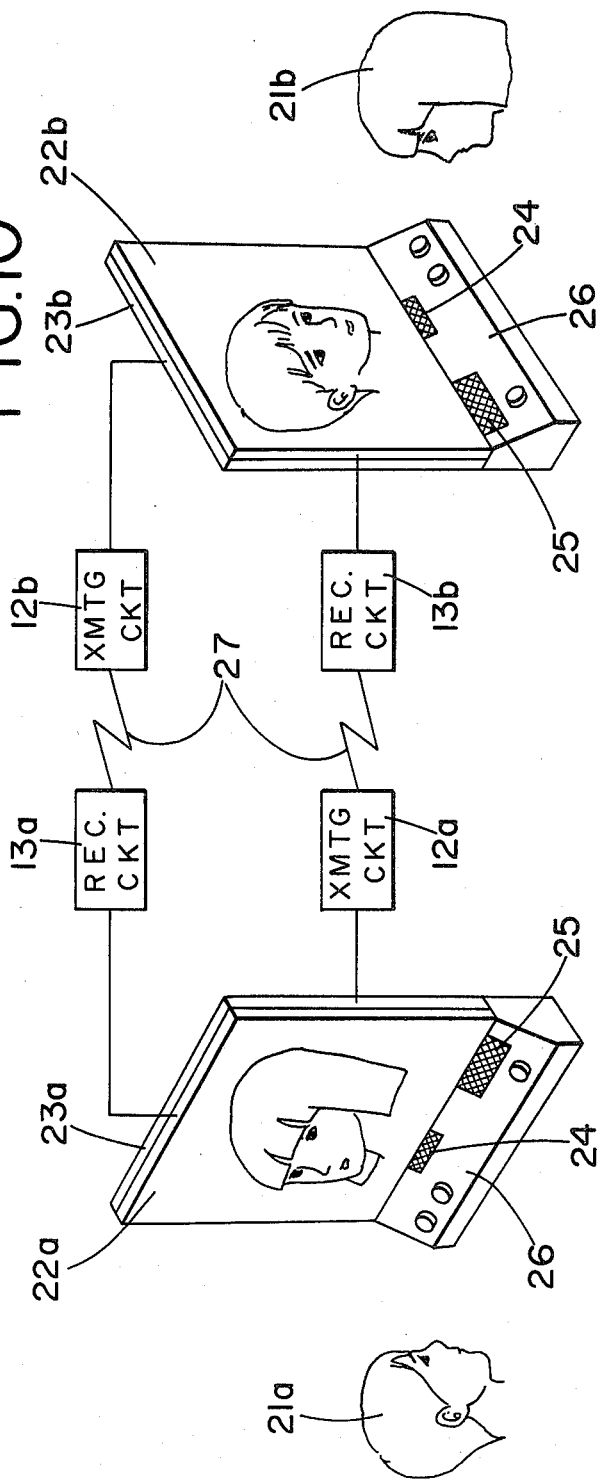
FIG. 10 is a block diagram showing one mode, in which the picture display-image pickup apparatus according to the present invention is used.

FIG. 10 is a block diagram showing an application, in which the present invention has its embodiment used in a video telephone. A talker 21a talks with his partner 21b while confirming the information, which is received in a receiving circuit 13a through lines 27, in view of the picture which is displayed in a display device 22a. Numeral 26 indicates a control panel for designating the number of the partner. Numerals 24 and 25 indicate a microphone and a speaker for effecting the audio communication. The picture, which is picked up by a pickup device 23a at the side of the talker 21a, is processed and transmitted to the other partner 21b by a transmitting circuit 12a through transmission lines 27.

As has been described hereinbefore, it is possible to realize the video telephone which can produce the audio and video information in a mode to suffice the communication.

What is claimed is:

1. A picture display-image pickup apparatus for visual communication comprising a display element made of a transillumination controllable material, the transparency and opaqueness of which may be controlled in accordance with an applied electric field, used in a picture display device which is arranged to face a talker, said picture display device further comprising an image pickup device, said image pickup device being arranged inside of and on the common optical axis of said display device.

2. An apparatus according to claim 1, wherein a condensing lens is interposed between said picture display device and said image pickup device.

3. The apparatus of claim 1 wherein said image pickup device is a vidicon.

4. The apparatus of claim 1 wherein said material is a liquid crystal.

5. The apparatus of claim 1 wherein said material is PLZT.

6. The apparatus of claim 1 wherein said material is EC.

7. An apparatus according to claim 1, wherein the image pickup device is a solid state image sensing element of the class comprising an array of individual sensing elements arranged in an X-Y matrix.

8. An apparatus according to claim 7, wherein a condensing lens is interposed between said picture display device and said solid state image sensing element.

9. An apparatus according to claim 7, wherein said picture display device and said solid state image sensing device are made to contact each other thereby to form a unitary structure.

10. The apparatus of claim 7 wherein said elements are CCDs.

11. The apparatus of claim 7 wherein said elements are BBDs.

12. The apparatus of claim 7 wherein said elements are photodiodes.

13. The apparatus of claim 7 wherein said image pickup device is an image orthicon tube.

14. An apparatus according to claim 1 or 7, wherein said picture display device includes two transparent plates, a liquid crystal sandwitched in between and a plurality of transparent electrodes formed horizontally and vertically on the inner sides of said transparent plates, respectively.

15. An apparatus according to claim 1 or 7, wherein said apparatus includes control means for controlling said picture display device and image pickup device such that said display device turns transparent after said transillumination controllable material is controlled into opaque to display a picture and the talker's image passes through said transparent display device to reach said pickup device which is operated during the transparent condition of said display device.

* * * * *